(12) United States Patent
Tanaka

(10) Patent No.: US 9,448,117 B2
(45) Date of Patent: Sep. 20, 2016

(54) INFRARED THERMOMETER

(71) Applicant: BIO ECHO NET Inc, Sapporo-shi, Hokkaido (JP)

(72) Inventor: Hideki Tanaka, Sapporo (JP)

(73) Assignee: BIO ECHO NET Inc, Sapporo-shi (JP)

( * ) Notice: Subject to any disclaimer, the term of this patent is extended or adjusted under 35 U.S.C. 154(b) by 406 days.

(21) Appl. No.: 13/961,961

(22) Filed: Aug. 8, 2013

(65) Prior Publication Data
US 2015/0043613 A1 Feb. 12, 2015

(51) Int. Cl.
*G01J 5/00* (2006.01)
*A61B 5/00* (2006.01)
*G01J 5/02* (2006.01)
*G01J 5/04* (2006.01)

(52) U.S. Cl.
CPC ............ *G01J 5/0275* (2013.01); *G01J 5/0025* (2013.01); *G01J 5/04* (2013.01)

(58) Field of Classification Search
None
See application file for complete search history.

(56) References Cited

U.S. PATENT DOCUMENTS

| 6,090,050 | A | * | 7/2000 | Constantinides | ...... A61B 5/015 374/100 |
| 7,314,310 | B2 | * | 1/2008 | Medero | ...... G01K 7/42 374/164 |
| 2008/0246625 | A1 | * | 10/2008 | Chen | ...... G01J 5/0022 340/686.6 |
| 2010/0315258 | A1 | * | 12/2010 | Hiramatsu | ...... G01K 13/002 340/815.45 |
| 2010/0328090 | A1 | * | 12/2010 | Hiramatsu | ...... G01K 13/002 340/687 |
| 2011/0105910 | A1 | * | 5/2011 | Lawson | ...... G01J 5/0003 600/474 |
| 2011/0106484 | A1 | * | 5/2011 | Quinn | ...... A61B 5/01 702/135 |
| 2011/0257521 | A1 | * | 10/2011 | Fraden | ...... A61B 5/01 600/438 |
| 2012/0328090 | A1 | * | 12/2012 | Macwan | ...... G06Q 30/0267 379/114.03 |

FOREIGN PATENT DOCUMENTS

| EP | 2302342 A1 | 3/2011 |
| JP | S61-50038 A | 1/1986 |
| JP | H05-269087 A | 10/1993 |
| JP | H07-178062 A | 7/1995 |
| JP | 2000-296116 A | 10/2000 |
| JP | 2005-342376 A | 12/2005 |
| JP | 2006-110363 A | 4/2006 |
| JP | 2009-222704 A | 10/2009 |
| WO | 8403378 A1 | 8/1984 |

OTHER PUBLICATIONS

Japanese office action letter issued on Nov. 11, 2014.
Taiwanese office action letter issued on Aug. 8, 2014.

* cited by examiner

*Primary Examiner* — Lisa Caputo
*Assistant Examiner* — Nasir U Ahmed
(74) *Attorney, Agent, or Firm* — Mots Law, PLLC

(57) ABSTRACT

An infrared thermometer includes a proximity sensor, an infrared sensor and a micro controller unit. The micro controller unit determines whether or not the infrared thermometer has contact with an object to be measured, using the proximity sensor. The micro controller unit measures the amount of infrared radiation using the infrared sensor at a time when determining that the infrared thermometer has contact with the object to be measured. The micro controller unit calculates a temperature of the object to be measured, based on the amount of infrared radiation.

8 Claims, 5 Drawing Sheets

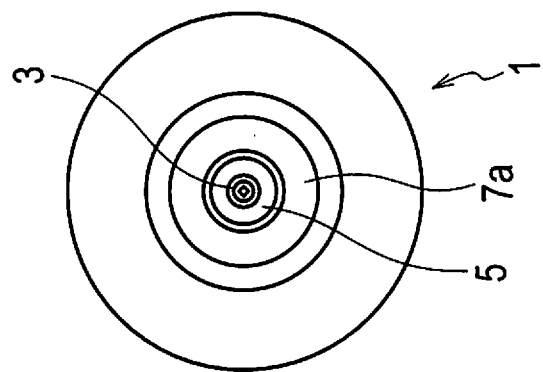
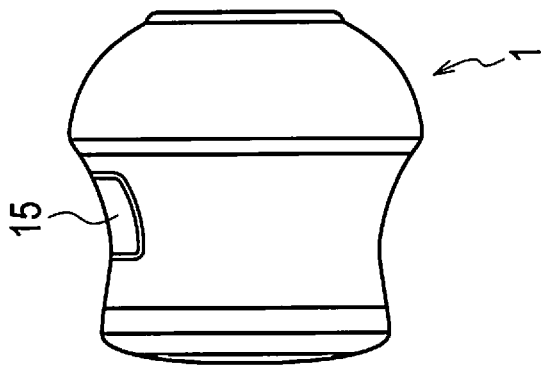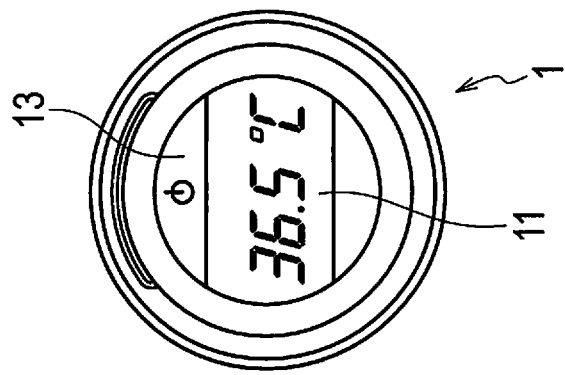

INFRARED THERMOMETER

BACKGROUND OF THE INVENTION

1. Field of the Invention

The present invention relates to an infrared thermometer that measures a body temperature using an infrared sensor.

2. Description of the Related Art

A thermometer that measures a body temperature using an infrared sensor is very effective for the measurement of a body temperature of a colicy, sleeping or squirming baby, infant or the like because the thermometer can measure a body temperature quickly.

The infrared sensor measures the amount of infrared radiation from an object to be measured such as a skin in a human body to detect a temperature of the object (that is, a body temperature). Since an infrared ray attenuates in inverse proportion to the square of distance, it is required to measure the distance between the infrared sensor and the object precisely, or measure the amount of infrared radiation while keeping the distance between the infrared sensor and the object constant.

Conventionally, since a measurer performs the setting or measurement of the distance between an infrared sensor and an object to be measured with his/her skill such as "setting it to several inches" or "setting it to a mark of light", it depends extensively on the measurer's skill (e.g., Japanese Patent Application Laid-open Publication No. 2005-342376).

As described above, conventionally, since a measurer performs the setting or measurement of the distance between an infrared sensor and an object to be measured with his/her skill such as "setting it to several inches" or "setting it to a mark of light", an error on the distance between the infrared sensor and the object often occurs. So, it is difficult to measure a body temperature precisely.

SUMMARY OF THE INVENTION

The present invention is made in view of the above-described problem and has an object to provide an infrared thermometer capable of measuring a body temperature precisely without caring about the distance between an infrared sensor and an object to be measured.

According to a first aspect of the present invention, there is provided an infrared thermometer that measures a temperature using an infrared sensor, including: a determination unit configured to determine whether or not a sensor body including the infrared sensor therein has contact with an object to be measured; a measurement unit configured to measure an amount of infrared radiation using the infrared sensor at a time when the determination unit determines that the sensor body has contact with the object to be measured; and a calculation unit configured to calculate a temperature based on the amount of infrared radiation measured by the measurement unit.

The infrared thermometer measures the amount of infrared radiation using the infrared sensor at a time when it is determined that the sensor body including the infrared sensor therein has contact with the object to be measured, and then calculates a temperature based on the measured amount of infrared radiation. Therefore, it is very effective to measure a body temperature of a baby, an infant or the like who is unwilling to be subject to the measurement while twisting his/her head away, reflexively moves his/her head when a material such as a thermometer has contact with him/her, is colicy, or is squirming. It is possible to surely and easily measure a body temperature of a baby, an infant or the like without failing to measure the body temperature.

In a preferred embodiment, the measurement unit includes: a proximity sensor configured to measure capacitance at a time when the sensor body is moved closer to the object to be measured, and detect a distance between the sensor body and the object to be measured based on the capacitance; a memory configured to previously store certain capacitance at a time when the sensor body has contact with the object to be measured; and a determiner configured to compare the capacitance measured by the proximity sensor with the certain capacitance, and determine that the sensor body has contact with the object to be measured when the capacitance is the certain capacitance.

The infrared thermometer measures capacitance at the time when the sensor body is moved closer to the object to be measured, compares the measured capacitance with the certain capacitance previously stored in the memory, and determines that the sensor body has contact with the object to be measured when the measured capacitance is the certain capacitance. Therefore, it is very effective to measure a body temperature of a baby, an infant or the like who is unwilling to be subject to the measurement while twisting his/her head away, is colicy or is squirming because the infrared thermometer certainly detects the contact with a human body to measure the body temperature, for example.

In a preferred embodiment, the measurement unit includes: a proximity sensor configured to detect a proximity distance that the sensor body approaches the object to be measured; a monitor configured to monitor the temperature calculated by the calculation unit when the proximity distance detected by the proximity sensor is a certain distance or less; and a determiner configured to determine that the sensor body has contact with the object to be measured when the temperature monitored by the monitor is around a certain temperature.

The infrared thermometer monitors the calculated temperature based on the amount of infrared radiation measured using the infrared sensor when the proximity distance is the certain distance or less, and determines that the sensor body has contact with the object to be measured when the monitored temperature is around the certain temperature. Therefore, it is very effective to measure a body temperature of a baby, an infant or the like who is unwilling to be subject to the measurement while twisting his/her head away, is colicy or is squirming because the infrared thermometer certainly detects the contact with a human body to measure the body temperature, for example.

In a preferred embodiment, the certain temperature is a body temperature.

In the infrared thermometer, the certain temperature is the body temperature. The infrared thermometer determines that the sensor body has contact with the object to be measured when the monitored temperature is the certain temperature. Therefore, it is effective to determine that the sensor body has contact with a skin in a human body when the monitored temperature is around the body temperature, except for a case of extremely-low temperature or outside air temperature. Thereby, it is very effective to measure a body temperature of a baby, an infant or the like who is unwilling to be subject to the measurement while twisting his/her head away, is colicy or is squirming because the infrared thermometer certainly detects the contact with a human body to measure the body temperature, for example.

In a preferred embodiment, the certain distance is a distance within 5 mm to 5 cm.

In the infrared thermometer, the certain distance is a distance within 5 mm to 5 cm. Therefore, it is effective to monitor the temperature from a point when the proximity distance is the certain distance, in order to promote the efficiency of temperature measurement.

According to the present invention, the infrared thermometer measures the amount of infrared radiation using the infrared sensor at a time when it is determined that the sensor body including the infrared sensor therein has contact with the object to be measured, and then calculates a temperature based on the measured amount of infrared radiation. Therefore, it is very effective to measure a body temperature of a baby, an infant or the like who is unwilling to be subject to the measurement while twisting his/her head away, reflexively moves his/her head when a material such as a thermometer has contact with him/her, is colicy, or is squirming. It is possible to surely and easily measure a body temperature of a baby, an infant or the like without failing to measure the body temperature.

According to the present invention, the infrared thermometer measures capacitance at the time when the sensor body has contact with the object to be measured, compares the measured capacitance with the certain capacitance previously stored in the memory, and determines that the sensor body has contact with the object to be measured when the measured capacitance is the certain capacitance. Therefore, it is very effective to measure a body temperature of a baby, an infant or the like who is unwilling to be subject to the measurement while twisting his/her head away, is colicy or is squirming because the infrared thermometer certainly detects the contact with a human body to measure the body temperature, for example.

According to the present invention, the infrared thermometer monitors the calculated temperature based on the amount of infrared radiation measured using the infrared sensor when the proximity distance is the certain distance or less, and determines that the sensor body has contact with the object to be measured when the monitored temperature is around the certain temperature. Therefore, it is very effective to measure a body temperature of a baby, an infant or the like who is unwilling to be subject to the measurement while twisting his/her head away, is colicy or is squirming because the infrared thermometer certainly detects the contact with a human body to measure the body temperature, for example.

BRIEF DESCRIPTION OF THE DRAWINGS

FIG. 3A is a rear view that illustrates a rear surface of the infrared thermometer illustrated in FIG. 1.

FIG. 3B is a side view that illustrates a side surface of the infrared thermometer illustrated in FIG. 1.

FIG. 3C is a front view that illustrates a front surface of the infrared thermometer illustrated in FIG. 1.

DESCRIPTION OF THE EMBODIMENTS

An exemplary embodiment (herein after called embodiment) of the present invention will be described below with reference to the drawings.

Figure 1:
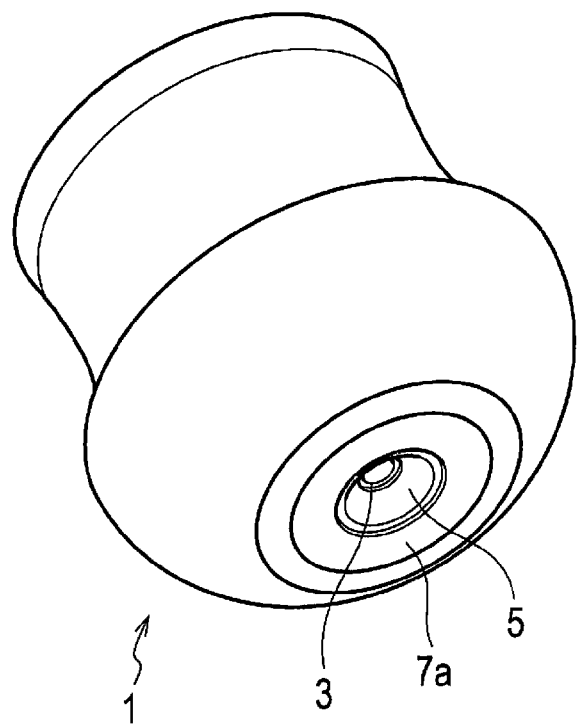
FIG. 1 is a perspective view that illustrates an infrared thermometer according to an exemplary embodiment of the present invention.

FIG. 1 is a perspective view that illustrates an infrared thermometer according to the embodiment of the present invention. Since the infrared thermometer 1 shown in FIG. 1 is formed into a barrel shape with a slightly vertically-elongated portion that is narrow in the middle thereof, it is easy for a user to hold a slightly concave portion at a center of a side surface thereof between his/her fingers. A user holds the concave portion and touches an object to be measured for body temperature (e.g., a center portion of forehead) with the infrared thermometer 1, which allows the measurement of the body temperature at the time of the touch. Thus, since the infrared thermometer 1 measures a body temperature at the time of the touch, the infrared thermometer 1 can measure a body temperature precisely without caring about the distance between an infrared sensor and a human body as before.

The infrared thermometer 1 includes an infrared sensor for measuring a body temperature, and a proximity sensor for measuring the distance between an object to be measured in a human body and a top part of the infrared thermometer 1. The infrared thermometer 1 is concaved to have a mortar-like shape, at a substantial center portion of a front surface side of a sensor body thereof, that is, a substantial center portion of the top part thereof facing the lower right in FIG. 1. The infrared sensor 3 is mounted to the center of the mortar-like shaped portion. Then, a ground electrode 5 and an electrode 7 included in the proximity sensor are mounted around the infrared sensor 3 (see FIG. 2, it is noted that an electrode outer cover 7a which is a protection member of the electrode 7 is illustrated in FIGS. 1 and 3C). This can sense approach of the infrared sensor 3 to an object to be measured in a human body or the like in an appropriate manner.

Figure 2:
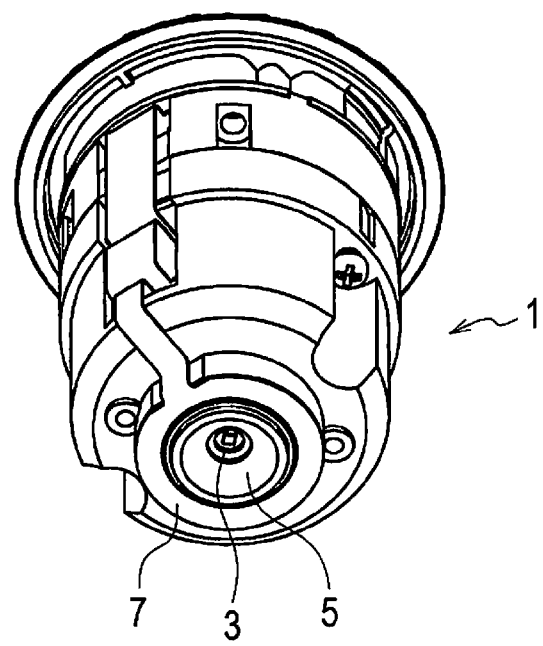
FIG. 2 is a perspective view that illustrates a state where a cover of the infrared thermometer illustrated in FIG. 1 has been detached.

FIG. 2 is a perspective view that illustrates a state where a cover of the infrared thermometer 1 illustrated in FIG. 1 has been detached. As shown in FIGS. 1 and 2, the ground electrode 5 of the proximity sensor is formed on a side surface of the mortar-like shaped portion around the infrared sensor 3, and the electrode 7 of the proximity sensor is formed on a ring-shaped portion around the ground electrode 5. Therefore, when the top part of the infrared thermometer 1 where there are the infrared sensor 3, the ground electrode 5 and the electrode 7 of the proximity sensor approaches a human body, the infrared sensor 3 detects an infrared ray from the human body while the proximity sensor mounted to the top part measures the distance between an object to be measured in the human body and the top part of the infrared thermometer 1. The infrared thermometer 1 is configured to measure a body temperature based on the amount of the detected infrared radiation.

It is noted that the ground electrode 5 is mounted around the infrared sensor 3, and configures a sensor frame for stabilizing a temperature to be measured by the infrared sensor 3 and reflecting radiation from the side surface of the mortar-like shaped portion. Since the sensor frame functions as the ground electrode 5, the ground electrode 5 has adequate area.

FIGS. 3A, 3B and 3C are a rear view, a side view and a front view that respectively illustrate a rear surface, a side surface and a front surface of the infrared thermometer 1 shown in FIG. 1. A liquid crystal display 11 which includes a liquid crystal (LCD) for displaying a body temperature is provided on the rear surface of the infrared thermometer 1 shown in FIG. 3A. A power source switch 13 with a wide surface to be pressed is provided at an upper side of the liquid crystal display 11. When the power source switch 13 is turned on, the infrared thermometer 1 operates to measure a body temperature and display the measured body temperature on the liquid crystal display 11.

A battery accommodator 15 is provided on the side surface of the infrared thermometer 1 shown in FIG. 3B. The battery accommodator 15 functions as a power source of the infrared thermometer 1 by inserting therein a battery such as a button battery having an electric voltage within a range of 1.5 to 3.0 V and then securing a cover with a screw or the like, which causes the infrared thermometer 1 to operate.

Figure 4:
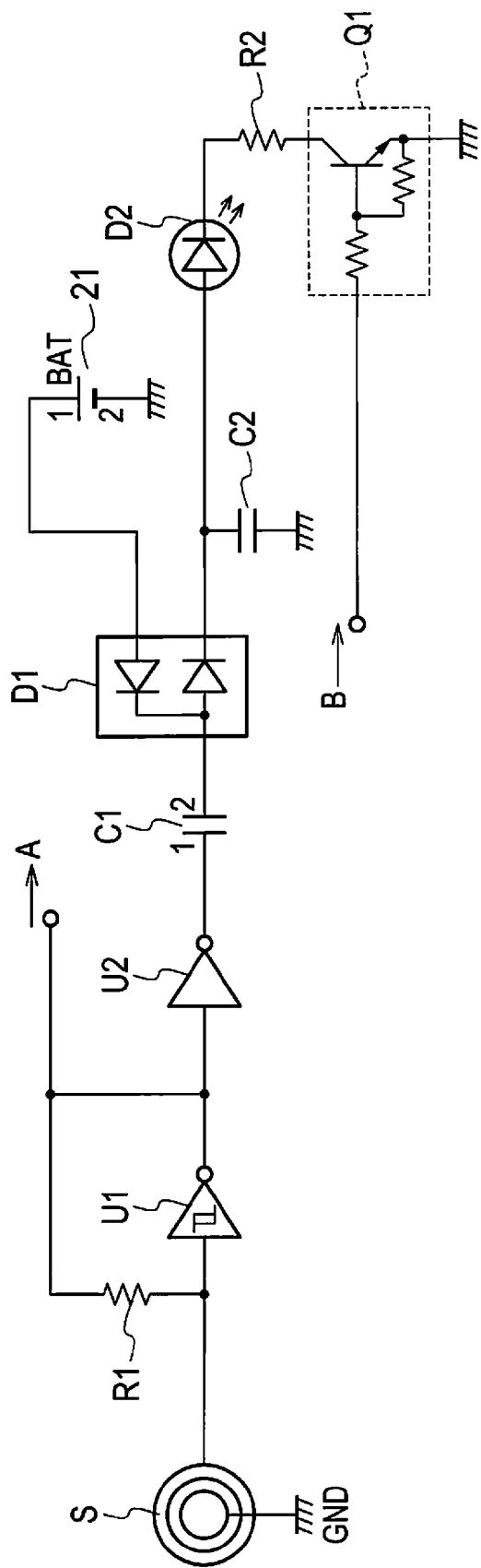
FIG. 4 is a circuit diagram that illustrates a part of a circuit in the infrared thermometer illustrated in FIG. 1.

FIG. 4 is a circuit diagram that illustrates a part of a circuit in the infrared thermometer 1 shown in FIG. 1. The circuit shown in FIG. 4 includes a part of a measuring circuit for measuring, based on capacitance measured by the proximity sensor, the distance between an object to be measured in a human body and the top part of the infrared thermometer 1 where there is the proximity sensor, and a part of a circuit for a notifying function in which a user is notified of completion of measure of a body temperature by the infrared thermometer 1 and for a liquid crystal backlight of the liquid crystal display 11.

Capacitance between the electrode 7 and the ground electrode 5 included in the proximity sensor varies depending on the distance between the proximity sensor and an object to be measured in a human body which the proximity sensor approaches. As shown in FIG. 4, when capacitance between the electrode 7 and the ground electrode 5 is supplied to an input of Schmitt trigger CMOS inverter U1 whose an input side is connected to a resistor R1, the Schmitt trigger CMOS inverter U1 oscillates in an oscillation frequency F represented by the following equation.

$$F = 1/(0.8 \times Cf \times R1)$$

In this equation, "Cf" is capacitance including capacitance between the electrode 7 and the ground electrode 5 included in the proximity sensor and floating capacitance of wiring, which is capacitance varying depending on the distance between an object to be measured in a human body which the proximity sensor approaches and the proximity sensor as describe above, and "R1" is a resistance value of the resistor R1 in FIG. 4.

Thus, an output signal A of the Schmitt trigger CMOS inverter U1 which oscillates in the oscillation frequency F is supplied to a micro controller unit (hereinafter, abbreviated as "MCU") with a micro processor to be described later. The oscillation frequency F is counted by the MCU, and the distance between an object to be measured in a human body and the proximity sensor at the top part of the infrared thermometer 1 is calculated based on the count value.

When the proximity sensor approaches a skin (e.g., forehead) in a human body which is an object to be measured, capacitance C of the proximity sensor is proportional to an area of the electrode 7 of the proximity sensor, and inversely proportional to the distance between the proximity sensor and the skin in the human body which is an object to be measured, and has a value nearly represented by the following equation when the proximity sensor approaches it within about 5 mm.

$$C = \epsilon_0 S / 2t \tag{F}$$

In this equation, "S" is an area of an electrode of the proximity sensor, "t" is the distance between the proximity sensor and the skin in the human body which is an object to be measured, and $\epsilon_0$ is relative permittivity and has "1" in the air.

It is noted that when the proximity sensor separates from the skin in the human body which is an object to be measured, it is not expected that the proximity sensor functions as surface, which extremely reduces capacitance. At this time, the capacitance C of the proximity sensor is only proportional to the area of the electrode of the proximity sensor, the capacitance Cf has the sum of the floating capacitance of the wiring and a value proportional to a surface area of the electrode of the proximity sensor, and the capacitance Cf does not vary when the distance between the proximity sensor and the skin in the human body which is an object to be measured is changed.

Figure 5:
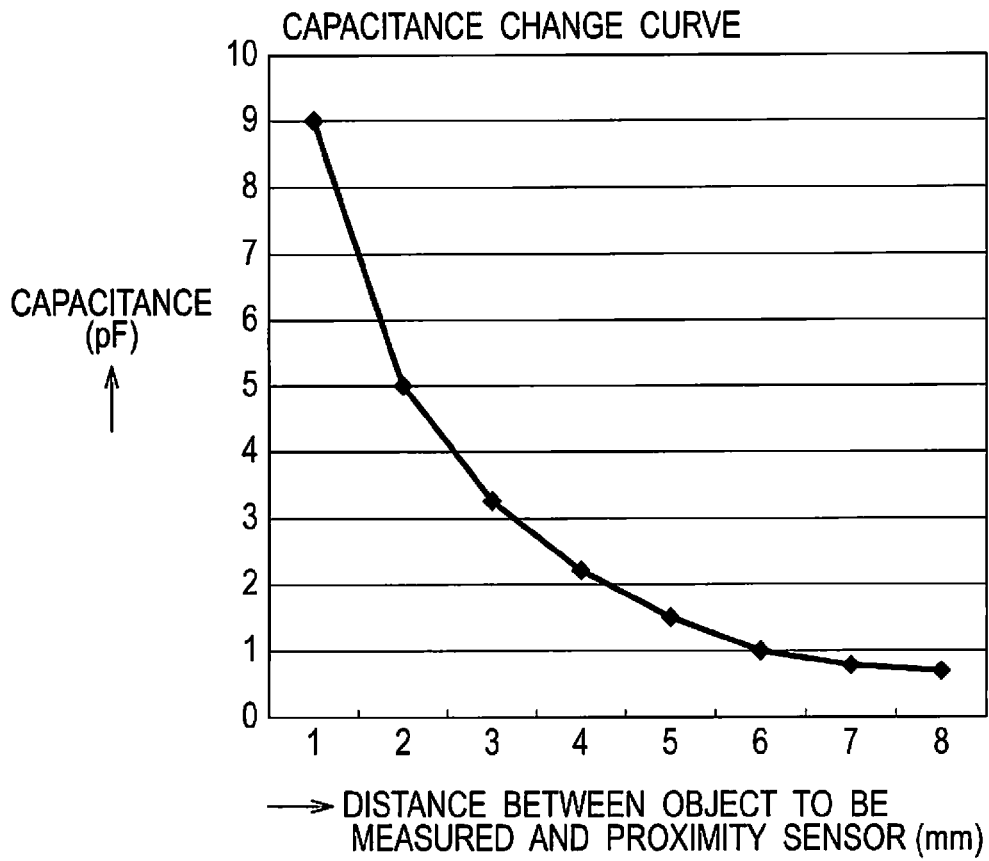
FIG. 5 is a graph that shows the relationship between a capacitance and a distance between an object to be measured and a proximity sensor used in the infrared thermometer illustrated in FIG. 1.

FIG. 5 is a graph of a capacitance change curve that shows the relationship between the capacitance of the proximity sensor and the distance between the proximity sensor and an object to be measured. As shown in FIG. 5, when the distance between the proximity sensor and an object to be measured is equal to or less than 5 mm, the capacitance of the proximity sensor is proportional to an area of the electrode of the proximity sensor, and inversely proportional to the distance between the proximity sensor and an object to be measured, as represented in the above-described equation. However, when the proximity sensor separates from an object to be measured, it is not expected that the proximity sensor functions as surface, which extremely reduces capacitance.

Returned to FIG. 4, as described above, when the output signal A of the Schmitt trigger CMOS inverter U1 which oscillates in the oscillation frequency F is supplied to the MCU, the distance between the proximity sensor and an object to be measured is calculated. In addition to this, an electric voltage which is 3V of the battery accommodated in the battery accommodator 15 is supplied to a booster circuit which boosts the electric voltage to 6V, in order to light a blue-color light-emitting diode (LED) for notification of completion of measure of a body temperature which is to be described later, for example.

Namely, in FIG. 4, the output signal A of the Schmitt trigger CMOS inverter U1 is supplied to a CMOS inverter U2 other than the MCU to be inversely amplified, which causes it to become a rectangular wave signal in which 0V and 3V which is an electric voltage E of the battery 21, alternately appear. The rectangular wave signal is supplied to a capacitor C1. The capacitor C1 is charged to about 3V which is the electric voltage E of the battery 21 using a subsequent Schottky diode D1.

When an output of the CMOS inverter U2 is 0V, a "2" side terminal of the capacitor C1 has a positive polarity and a "1" side terminal of the capacitor C1 has a negative polarity. This charges the capacitor C1 up to 3V which is the electric voltage E. Also, when an output of the CMOS inverter U2 is 3V, the capacitor C1 is connected to the CMOS inverter U2 in series. This generates the electric voltage 2E which is 6V (2×(electric voltage E which is 3V)) at the "2" side terminal of the capacitor C1 because the electric voltage to which the capacitor C1 has been charged, is added to the output of the CMOS inverter U2. A capacitor C2 is charged by the electric voltage 2E which is 6V through the Schottky diode D1.

Thus, the electric voltage 2E which is 6V up to which the capacitor C2 has been charged, is supplied to the blue-color light-emitting diode (LED) D2 for notification of completion of measure of a body temperature, for example. The light-emitting diode D2 is connected to a resistor R2 and a transistor for modulating light Q1 in series. A current flowing into the light-emitting diode D2 is determined by the resistor R2. Also, the transistor for modulating light Q1 is turned on and off by a control signal for modulating light B from the MCU which is supplied to a base of the transistor for modulating light Q1. The light-emitting diode D2 is controlled to have the maximum luminance when the transistor for modulating light Q1 is turned on.

Figure 6:
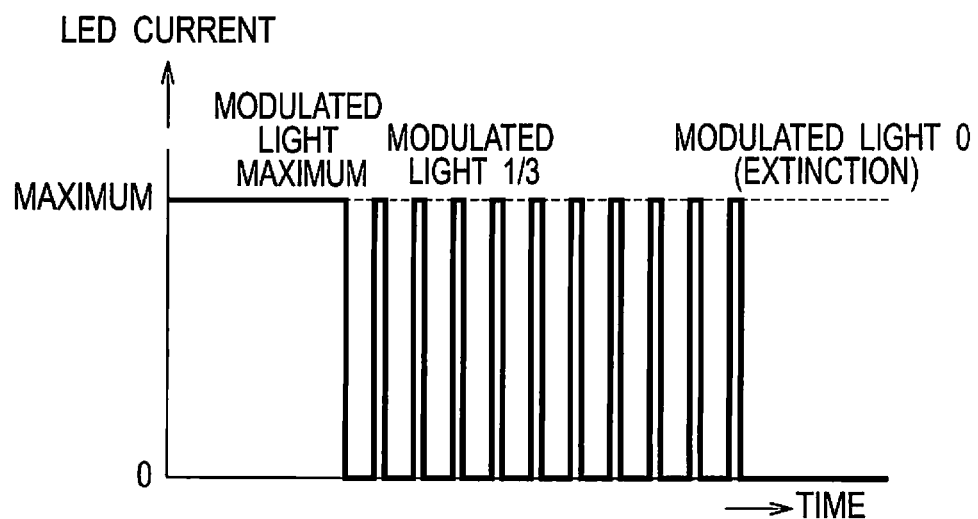
FIG. 6 is a diagram that illustrates a modulated light state and a current flowing in a light-emitting diode (LED) used in the infrared thermometer illustrated in FIG. 1.

Namely, the transistor for modulating light Q1 is turned on and off by the control signal B from the MCU, which controls a current flowing into the light-emitting diode D2. As shown in FIG. 6, the modulated light has a maximum value when a current continuously flows into the light-emitting diode D2. The modulated light has one-third of the maximum value when the transistor for modulating light Q1 is turned on and off. The light-emitting diode D2 turns off light when a current is blocked off, which causes the modulated light to become 0. A cycle in which the light-emitting diode D2 is repeatedly turned on and off such that the modulated light has one-third of the maximum value, is set 1.6 ms or less for example, so as to prevent a human from feeling flickering light in vision. The light-emitting diode D2 is also used as a liquid crystal backlight. Due to this, the light-emitting diode D2 modulates light in multistep manner.

Figure 7:
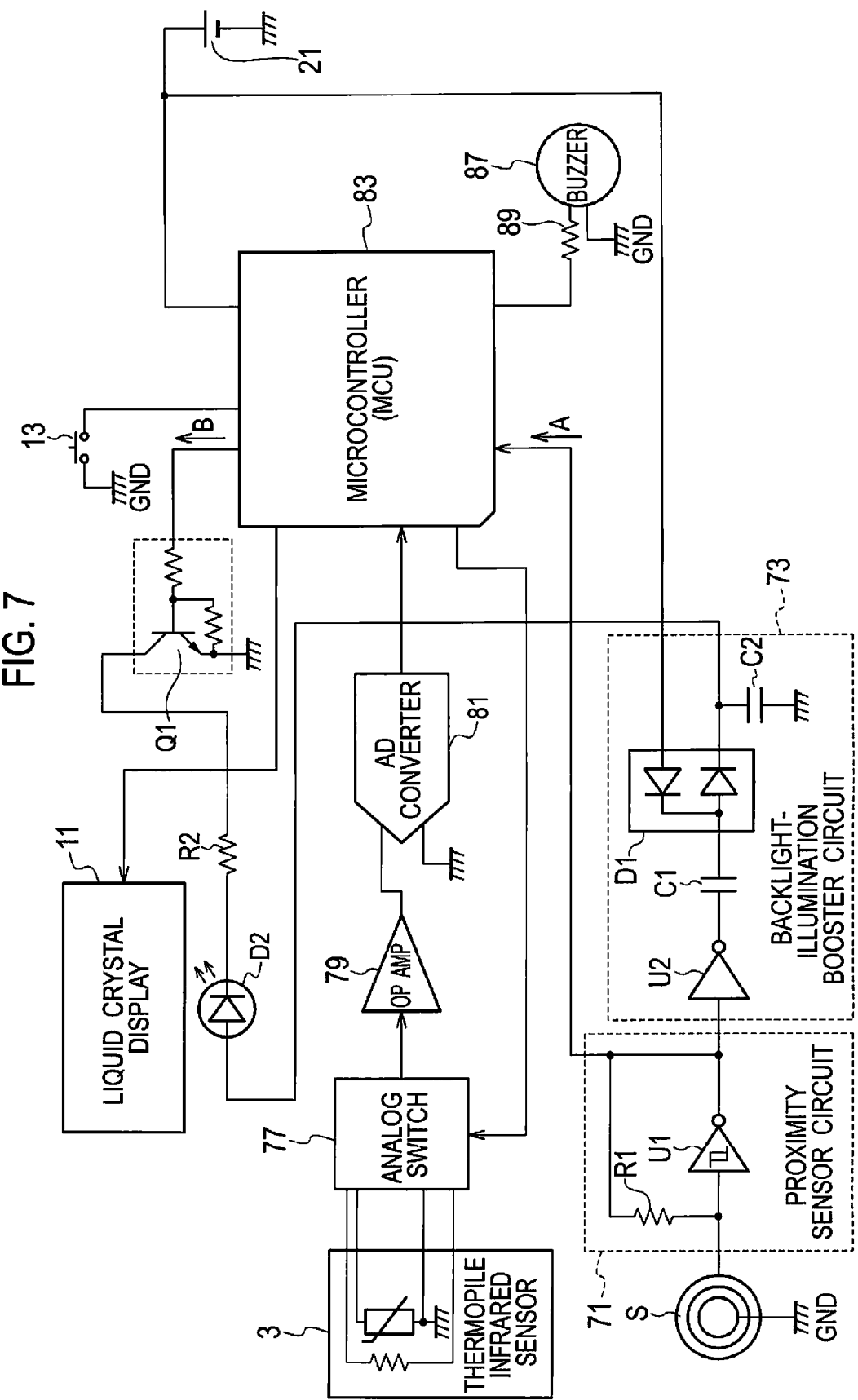
FIG. 7 is the whole circuit diagram of the infrared thermometer illustrated in FIG. 1.

FIG. 7 is the whole circuit diagram of the infrared thermometer 1 in the present embodiment. More specifically, FIG. 7 is the whole circuit diagram of the infrared thermometer 1 in the present embodiment which includes: a part of the measuring circuit for measuring, based on capacitance measured by the proximity sensor, the distance between an object to be measured in a human body and the top part of the infrared thermometer 1 where there is the proximity sensor; a part of the circuit for a notifying function in which a user is notified of completion of measure of a body temperature by the infrared thermometer 1 and for a liquid crystal backlight of the liquid crystal display 11; and the MCU.

It is noted that in FIG. 7, the part of the measuring circuit for measuring, based on capacitance measured by the proximity sensor, the distance between an object to be measured in a human body and the top part of the infrared thermometer 1 where there is the proximity sensor, is shown as an proximity sensor circuit 71, and the part of the circuit for a notifying function in which a user is notified of completion of measure of a body temperature by the infrared thermometer 1 and for a liquid crystal backlight of the liquid crystal display 11, is shown as a backlight-illumination booster circuit 73.

The output signal A of the Schmitt trigger CMOS inverter U1 from the proximity sensor circuit 71 is supplied to the MCU 83, and then the distance between an object to be measured in a human body and the top part of the infrared thermometer 1 where there is the proximity sensor, is calculated in the MCU 83 as described above. Then, the control signal for modulating light B is output from the MCU 83 and supplied to the transistor for modulating light Q1. The light-emitting diode D2 is controlled by the transistor for modulating light Q1 through the resistor R, which performs a control of modulating light and a control of liquid crystal backlight of the liquid crystal display 11. It is noted that the boosted electric voltage of 6V from the backlight-illumination booster circuit 73 is supplied to the light-emitting diode D2. The power source switch 13 and the battery 21 which has 3V are connected to the MCU 83.

In the present embodiment, as the infrared sensor 3, a thermopile infrared sensor is used which is composed of a plurality of thermocouples connected in series. The amount of infrared radiation measured in the infrared sensor 3 is amplified in an OP Amp 79 through an analog switch 77, converted into a digital signal in an AD converter 81, and supplied to the MCU 83. As described above, the MCU 83 calculates a body temperature of an object to be measured in a human body based on a digital signal from the infrared sensor 3, and displays the calculated body temperature on the liquid crystal display 11.

As the notifying function in which a user is notified of completion of measure of a body temperature, a buzzer 87 is connected to the MCU 83 through a resistor 89, in addition to the light-emitting diode D2. The buzzer 87 sounds by a control of the MCU 83 to notify a user of completion of measure of a body temperature.

Next, an operation of the infrared thermometer 1 will be described.

First, the power source switch 13 of the infrared thermometer 1 is turned on, which supplies to the infrared thermometer 1, an operating voltage from the battery 21 having an electric voltage of 3V accommodated in the battery accommodator 15. Thereby, the infrared sensor 3 of the infrared thermometer 1 and the proximity sensor composed of the ground electrode 5 and the electrode 7 start to operate. At this time, as shown in FIG. 1, when a user holds the concave portion of the infrared thermometer 1 where the battery accommodator 15 is provided and then moves the top part of the infrared thermometer 1 closer to an object to be measured in a human body such as forehead, the MCU 83 monitors the distance between the proximity sensor and the object to be measured, based on capacitance between the ground electrode 5 and the electrode 7 of the proximity sensor provided at the top part.

More specifically, for the proximity sensor, the oscillation frequency F in the Schmitt trigger CMOS inverter U1 of the proximity sensor circuit 71 changes according to capacitance between the ground electrode 5 and the electrode 7 which changes depending on the distance between the proximity sensor and the object to be measured. The output signal A of the Schmitt trigger CMOS inverter U1 in which the oscillation frequency F changes, is supplied to the MCU 83. The MCU 83 counts the oscillation frequency F, and monitors whether or not the distance is a certain distance (e.g., 5 cm or less) while calculating the distance between the object to be measured and the top part of the infrared thermometer 1 based on the count result.

When the MCU 83 detects that the distance between the object to be measured and the top part of the infrared thermometer 1 is the certain distance (e.g., 5 cm or less), the MCU 83 starts to measure the amount of infrared radiation using the infrared sensor 3 from this point, and then detects a temperature of the object to be measured based on the amount of infrared radiation measured by the infrared sensor 3. More specifically, since the amount of infrared radiation measured by the infrared sensor 3 is supplied to the MCU 83 as a digital signal through the analog switch 77, the OP amp 79 and the AD converter 81, the MCU 83 calculates a temperature of the object to be measured based on the digital signal.

It is noted that although the certain distance is set to 5 cm or less in the present embodiment, the certain distance may be set to 5 mm or less depending on a sensing capability of the proximity sensor.

While the MCU 83 monitors the distance between an object to be measured and the top part of the infrared thermometer 1 based on capacitance from the proximity sensor (more specifically, based on the output signal A of the Schmitt trigger CMOS inverter U1 in which the oscillation frequency changes depending on capacitance from the proximity sensor circuit 71), the MCU 83 compares the capacitance from the proximity sensor with certain capacitance to detect whether the capacitance from the proximity sensor is the certain capacitance. The certain capacitance is capacitance at the time when the top part of the infrared thermometer 1 has contact with a skin in a human body which is an object to be measured, and is stored in a memory or the like in the MCU 83.

Thus, when the MCU 83 compares the capacitance from the proximity sensor with the certain capacitance and detects that the capacitance from the proximity sensor is the certain capacitance, the MCU 83 determines that the top part of the infrared thermometer 1 has contact with a skin in a human body which is an object to be measured. At this point, the MCU 83 determines that the temperature calculated based on the amount of infrared radiation measured by the infrared sensor 3 is a temperature of the object to be measured, and displays the temperature on the liquid crystal display 11 as a body temperature of the object to be measured. In addition to the body temperature measurement and display, the MCU 83 lights the blue light-emitting diode D2 and sounds the buzzer 87 to notify a user of the completion of measure of a body temperature.

It is noted that if a temperature measured using the infrared sensor 3 is higher than 28 degrees Celsius, the MCU 83 determines that this temperature is a body temperature of an object to be measure in a human body. If a temperature measured using the infrared sensor 3 is 28 degrees Celsius or less, the MCU 83 determines that the infrared thermometer 1 has contact with clothes, hair or the like other than a human body or is placed on a desk, and neglects this temperature.

Thus, in the present embodiment, when the MCU 83 detects that the distance between an object to be measured and the top part of the infrared thermometer 1 is the certain distance or less, the MCU 83 starts to measure the amount of infrared radiation using the infrared sensor 3, detects a temperature of an object to be measured based on the amount of infrared radiation, compares capacitance from the proximity sensor with the certain capacitance, and determines that the top part of the infrared thermometer 1 has contact with a skin in a human body which is an object to be measured when the capacitance from the proximity sensor is the certain capacitance. However, the determination whether or not the top part of the infrared thermometer 1 has contact with a skin in a human body which is an object to be measured is not limited to that based on the certain capacitance as described above. For example, the MCU 83 may perform a body temperature measurement process such that when the MCU 83 determines that a temperature of an object to be measured calculated based on the amount of infrared radiation measured by the infrared sensor 3 is a body temperature, the MCU 83 determines that the top part of the infrared thermometer 1 has contact with a skin in a human body which is an object to be measured.

More specifically, when determining that the calculated temperature is a body temperature, the MCU 83 determines that the top part of the infrared thermometer 1 has contact with a skin in a human body which is an object to be measured, and then displays the temperature on the liquid crystal display 11 as a body temperature of an object to be measured. In addition to the body temperature measurement and display, the MCU 83 lights the blue light-emitting diode D2 and sounds the buzzer 87 to notify a user of the completion of measure of a body temperature.

In a case where the body temperature measurement is performed in a normal measurement environment (e.g., examination room), it is considered that a body temperature is about 32 to 43 degrees Celsius, except for a case where a human body has an extremely-low temperature due to a cause that a person has been snowed in on a mountain or has been drifted for a long time in a sea or river, for example. Therefore, it is effective that when a detected temperature is higher than 28 degrees Celsius, the MCU 83 determines that the temperature is a body temperature of an object to be measured in a human body and determines that the top part of the infrared thermometer 1 has contact with a skin in a human body which is the object to be measured. It is noted that a threshold value (e.g., 28 degrees Celsius) used when the detected temperature is a body temperature of an object to be measured in a human body is optimized depending on an external temperature. In the present embodiment, if the detected temperature is lower than 28 degrees Celsius or less, the MCU 83 determines that the detected temperature is not a body temperature of an object to be measured in a human body, and then neglects the temperature. In a case where the top part of the infrared thermometer 1 does not have contact with an object to be measured in a human body, it is considered that the infrared sensor 3 measures an external temperature around it. For example, if an external temperature is 10 to 28 degrees Celsius, it is considered that the temperature is not a body temperature obviously. If an external temperature is around 30 degrees Celsius, a function of measuring the external temperature may be mounted to compensate the threshold value.

Although the infrared sensor 3 responds to a conductive material, it does not respond to a material such as wood or resin (e.g., wooden desk). Further, although the infrared sensor 3 responds to a metallic object (e.g., metallic desk), it neglects a detected temperature of the metallic object at the time when a room temperature is not high because a temperature of the metallic object does not reach the vicinity of a body temperature at this time.

In the present embodiment, when the MCU 83 detects that the distance between an object to be measured and the top part of the infrared thermometer 1 is the certain distance (e.g., 5 cm or less), the MCU 83 starts to measure the amount of infrared radiation using the infrared sensor 3 from this point, and starts to detect a temperature of an object to be measured based on the measured amount of infrared radiation. However, the MCU 83 may detect an optimal position, that is a position having a temperature around a body temperature (e.g., a center portion of forehead), while scanning the surface of a skin in a human body without bring the top part of the infrared thermometer 1 into contact with the skin in the human body from this point, and bring the top part of the infrared thermometer 1 into contact with the human body at this position to measure a body temperature at this position. It is noted that an artery which locates in the vicinity of the center portion of forehead in the human body, has the best deep temperature in the human body because the artery has a blood vessel extending to a brain and there is always a certain amount of blood flow without being influenced by control of body temperature.

In the present embodiment, a temperature is measured when the top part of the infrared thermometer 1 has contact with a skin in a human body, and the temperature is displayed on the liquid crystal display 11 as a body temperature. Therefore, the infrared thermometer 1 is very effective for the measurement of a body temperature of a baby, an infant or the like who is squirming or unwilling to be subject to the measurement while twisting his/her head away. Especially, a baby, an infant or the like reflexively moves his/her head when a material has contact with him/her. Therefore, it is very effective to measure a body temperature of a baby, an infant or the like at the same time when the infrared thermometer 1 has contact with him/her because the body temperature of the baby, the infant or the like is reliably and easily measured without failure.

The infrared thermometer 1 also has a function of converting a temperature on a surface of forehead into an axillary temperature and displaying it. Since a temperature derived from an artery which locates in the vicinity of a specific position such as the center portion of forehead is measured when this function is employed, it is necessary to measure a temperature at the specific position.

In addition to a temperature at the time of contact, using a temperature before the contact, that is a temperature measured at a position just before the contact, the infrared thermometer 1 may detect an effect due to the contact based on the relationship among the temperature before the contact, the temperature at the time of the contact and a temperature of the infrared thermometer 1 itself, and then adequately compensate a detected temperature in the light of the effect.

For example, since data before contact and date after the contact can be obtained independent of each other by using a temperature before the contact and a temperature after the contact, the infrared thermometer 1 can estimate an effect (effect due to a temperature of the infrared thermometer 1 itself) with respect to forehead when the infrared thermometer 1 has contact with the forehead, using the difference between the temperature before the contact and the temperature after the contact.

In a case where a view angle of a thermopile is about 100 degrees, the infrared thermometer 1 measures a broad range when it separates from an object to be measured, and measures a narrow range as it approaches the object to be measured. In this case, the infrared thermometer 1 can estimate an effect of outside air temperature or an individual difference based on changes of these measured values. Thereby, since it is possible to determine whether the whole of forehead has a uniform or non-uniform temperature distribution, the infrared thermometer 1 can adequately compensate a detected temperature based on the relationship between the temperature distribution and the outside air temperature.

For example, although it depends on the outside air temperature, a forehead generally has a non-uniform temperature distribution. Therefore, if the forehead has a substantially uniform temperature distribution, it can be determined that a human with the forehead is in a non-normal condition such as a febrile state or a heavily-clothed state. In this case, it is possible to compensate a detected temperature in view of the above.

The technical idea of the present invention is not limited to the present embodiment, and various modifications may be added within the scope of claims.

What is claimed is:

1. An infrared thermometer that measures a temperature using an infrared sensor, comprising:
   a determination unit configured to determine whether or not a sensor body including the infrared sensor therein has contact with an object to be measured;
   a measurement unit configured to measure an amount of infrared radiation using the infrared sensor at a time when the determination unit determines that the sensor body has contact with the object to be measured; and
   a calculation unit configured to calculate a temperature based on the amount of infrared radiation measured by the measurement unit,
   wherein the measurement unit comprises:
   a proximity sensor configured to measure capacitance when the sensor body approaches the object to be measured;
   a circuitry configured to output an oscillation frequency upon reception of the capacitance measured by the proximity sensor;
   a micro controller configured to calculate a proximity distance between the sensor body and the object to be measured, based on count of the oscillation frequency;
   a monitor configured to monitor the temperature calculated by the calculation unit when the proximity distance calculated by the micro controller is a certain distance or less; and
   a determiner configured to determine that the sensor body has contact with the object to be measured when the temperature monitored by the monitor is around a certain temperature.

2. The infrared thermometer according to claim 1, wherein the certain temperature is a body temperature.

3. The infrared thermometer according to claim 1, wherein the certain distance is a distance within 5 mm to 5 cm.

4. The infrared thermometer according to claim 1, wherein the certain temperature is a temperature between 32 to 43 degrees C.

5. An infrared thermometer that measures a temperature of an object to be measured, comprising:
   a proximity sensor that measures capacitance when a sensor body approaches the object to be measured;
   a circuitry configured to output an oscillation frequency upon reception of the capacitance measured by the proximity sensor;
   a micro controller that calculates a proximity distance between the sensor body and the object to be measured, based on count of the oscillation frequency, and detects the proximity distance being a certain distance or less;
   an infrared sensor that measures an amount of infrared radiation from a time when the micro controller detects the proximity distance measured by the proximity sensor being the certain distance or less;
   the micro controller calculates a temperature based on the amount of infrared radiation measured by the infrared sensor, and determines that the sensor body has contact with the object to be measured when the calculated temperature is around a certain temperature; and
   a display that displays the temperature calculated by the micro controller at a time when the micro controller determines that the sensor body has contact with the object to be measured.

6. The infrared thermometer according to claim 5, wherein the certain temperature is a body temperature.

7. The infrared thermometer according to claim 5, wherein the certain distance is a distance within 5 mm to 5 cm.

8. The infrared thermometer according to claim 5, wherein the certain temperature is a temperature between 32 to 43 degrees C.

* * * * *